US012227235B2

(12) United States Patent
Stutts et al.

(10) Patent No.: US 12,227,235 B2
(45) Date of Patent: Feb. 18, 2025

(54) STALL THERMAL PROTECTION FOR FORCE FEEDBACK ACTUATOR

(71) Applicant: STEERING SOLUTIONS IP HOLDING CORPORATION, Saginaw, MI (US)

(72) Inventors: Thomas J Stutts, Linwood, MI (US); Michael A Eickholt, Chesaning, MI (US); Steven J. Collier-Hallman, Frankenmuth, MI (US); Julie A Kleinau, Bay City, MI (US); Prerit Pramod, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 348 days.

(21) Appl. No.: 17/843,477

(22) Filed: Jun. 17, 2022

(65) Prior Publication Data

US 2022/0402544 A1 Dec. 22, 2022

Related U.S. Application Data

(60) Provisional application No. 63/212,243, filed on Jun. 18, 2021.

(51) Int. Cl.
B62D 5/04 (2006.01)

(52) U.S. Cl.
CPC ........... B62D 5/0487 (2013.01); B62D 5/046 (2013.01)

(58) Field of Classification Search
CPC .... B62D 5/0487; B62D 5/046; B62D 5/0496; B62D 5/006; B62D 5/0469; B62D 6/008; B62D 6/00
See application file for complete search history.

(56) References Cited

U.S. PATENT DOCUMENTS

| 6,166,502 | A | * | 12/2000 | Pattok | H02P 29/02 318/434 |
| 6,548,975 | B2 | | 4/2003 | Kleinau et al. | |
| 2012/0212167 | A1 | * | 8/2012 | Wu | H02P 6/14 318/400.13 |
| 2013/0123671 | A1 | * | 5/2013 | Ikeuchi | H02P 29/032 318/504 |
| 2020/0287492 | A1 | * | 9/2020 | Sega | H02P 6/185 |

FOREIGN PATENT DOCUMENTS

| CN | 101884164 B | * | 2/2013 | ............. H02P 21/06 |
| CN | 108233336 A | * | 6/2018 | ........... H02H 7/0822 |

* cited by examiner

Primary Examiner — Mary Cheung
(74) Attorney, Agent, or Firm — Dickinson Wright PLLC

(57) ABSTRACT

A method includes receiving motor velocity data, and, in response to a determination that the motor velocity data indicates that a velocity of a motor is below a threshold velocity: calculating a thermal metric corresponding to a phase imbalance of the motor; identifying at least one thermal mitigation parameter based on the thermal metric; generating at least one thermal management motor position command based on the at least one thermal mitigation parameter; and selectively controlling the motor according to the thermal management motor position command.

20 Claims, 12 Drawing Sheets

STALL THERMAL PROTECTION FOR FORCE FEEDBACK ACTUATOR

CROSS-REFERENCES TO RELATED APPLICATIONS

This patent application claims priority to U.S. Provisional Patent Application Ser. No. 63/212,243, filed Jun. 18, 2021, which is incorporated herein by reference in its entirety.

TECHNICAL FIELD

This disclosure related to vehicle steering systems, in particular systems and methods stall thermal protection for a force feedback actuator of a vehicle steering system.

BACKGROUND

Vehicles, such as cars, trucks, sport utility vehicles, crossovers, mini-vans, marine craft, aircraft, all-terrain vehicles, recreational vehicles, or other suitable vehicles, include a steering system, such as an electronic power steering (EPS) system, a steer-by-wire (SbW) system, or other suitable steering system. In SbW systems, a handwheel actuator may be employed to receive driver steering input and provide feedback force. The handwheel actuator may include a controller, electric motor, and mechanism to translate motor shaft torque to handwheel torque. Feedback force is typically provided by applying torque in the direction opposite of intended motion (e.g., to simulate rack force that would otherwise be translated through the pinion).

Typically, in EPS systems, rack end-of-travel stops limit the range of motion, therefore providing a mechanical travel stop for the handwheel. Since no mechanical connection is present in SbW systems, the handwheel actuator is used to provide a software travel stop (e.g., referred to as a soft stop) for the handwheel. This is typically achieved by ramping feedback force to a high value as the driver approaches the end-of-travel position.

SUMMARY

This disclosure relates generally to vehicle steering systems.

An aspect of the disclosed embodiments includes a method for preventing motor operation in motor positions having unbalanced phase currents. The method includes receiving motor velocity data, and, in response to a determination that the motor velocity data indicates that a velocity of a motor is below a threshold velocity: calculating a thermal metric corresponding to a phase imbalance of the motor; identifying at least one thermal mitigation parameter based on the thermal metric; generating at least one thermal management motor position command based on the at least one thermal mitigation parameter; and selectively controlling the motor according to the thermal management motor position command.

Another aspect of the disclosed embodiments includes a system for preventing motor operation in motor positions having unbalanced phase currents. The system includes a processor and a memory. The memory includes instructions that, when executed by the processor, cause the processor to: receive motor velocity data, and, in response to a determination that the motor velocity data indicates that a velocity of a motor is below a threshold velocity: calculate a thermal metric corresponding to a phase imbalance of the motor; identify at least one thermal mitigation parameter based on the thermal metric; generate at least one thermal management motor position command based on the at least one thermal mitigation parameter; and selectively control the motor according to the thermal management motor position command.

Another aspect of the disclosed embodiments includes an apparatus for preventing motor operation in motor positions having unbalanced phase currents. The apparatus includes a processor and a memory. The memory includes instructions that, when executed by the processor, cause the processor to: receive motor velocity data; and, in response to a determination that the motor velocity data indicates that a velocity of a motor is below a threshold velocity: calculate a thermal metric corresponding to a phase imbalance of the motor; identify, using at least one look-up table associated with the thermal metric, at least one thermal mitigation parameter based on the thermal metric; generate at least one thermal management motor position command based on the at least one thermal mitigation parameter; modify the thermal management motor position command by combining the thermal management motor position command with a measured handwheel position; and selectively control the motor according to the modified thermal management motor position command These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, marine craft, aircraft, all-terrain vehicles, recreational vehicles, or other suitable vehicles, include a steering system, such as an EPS system, a SbW system, or other suitable steering system. In SbW systems, a handwheel actuator may be employed to receive driver steering input and provide feedback force. The handwheel actuator may include a controller, electric motor, and mechanism to translate motor shaft torque to handwheel torque. Feedback force is provided by applying torque in the direction opposite of intended motion (e.g., to simulate rack force that would otherwise be translated through the pinion).

Typically, in EPS systems, rack end-of-travel stops limit the range of motion, therefore providing a mechanical travel stop for the handwheel. Since no mechanical connection is present in SbW systems, the handwheel actuator is used to provide a software travel stop (e.g., referred to as a soft stop) for the handwheel. This is typically achieved by ramping feedback force to a high value as the driver approaches the end-of-travel position.

Figure 3:
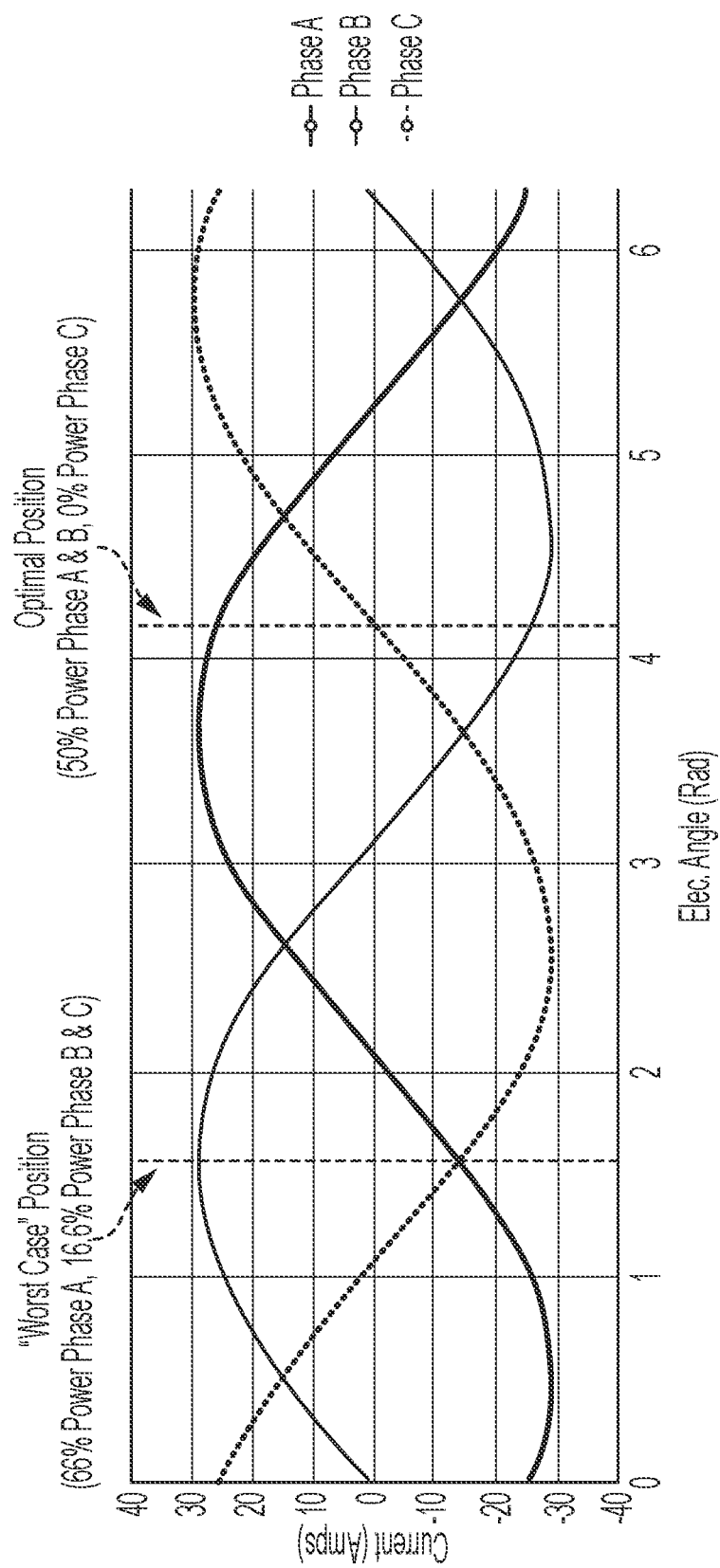
FIG. 3 is a current diagram of a three-phase system according to the principles of the present disclosure.
Figure 4:
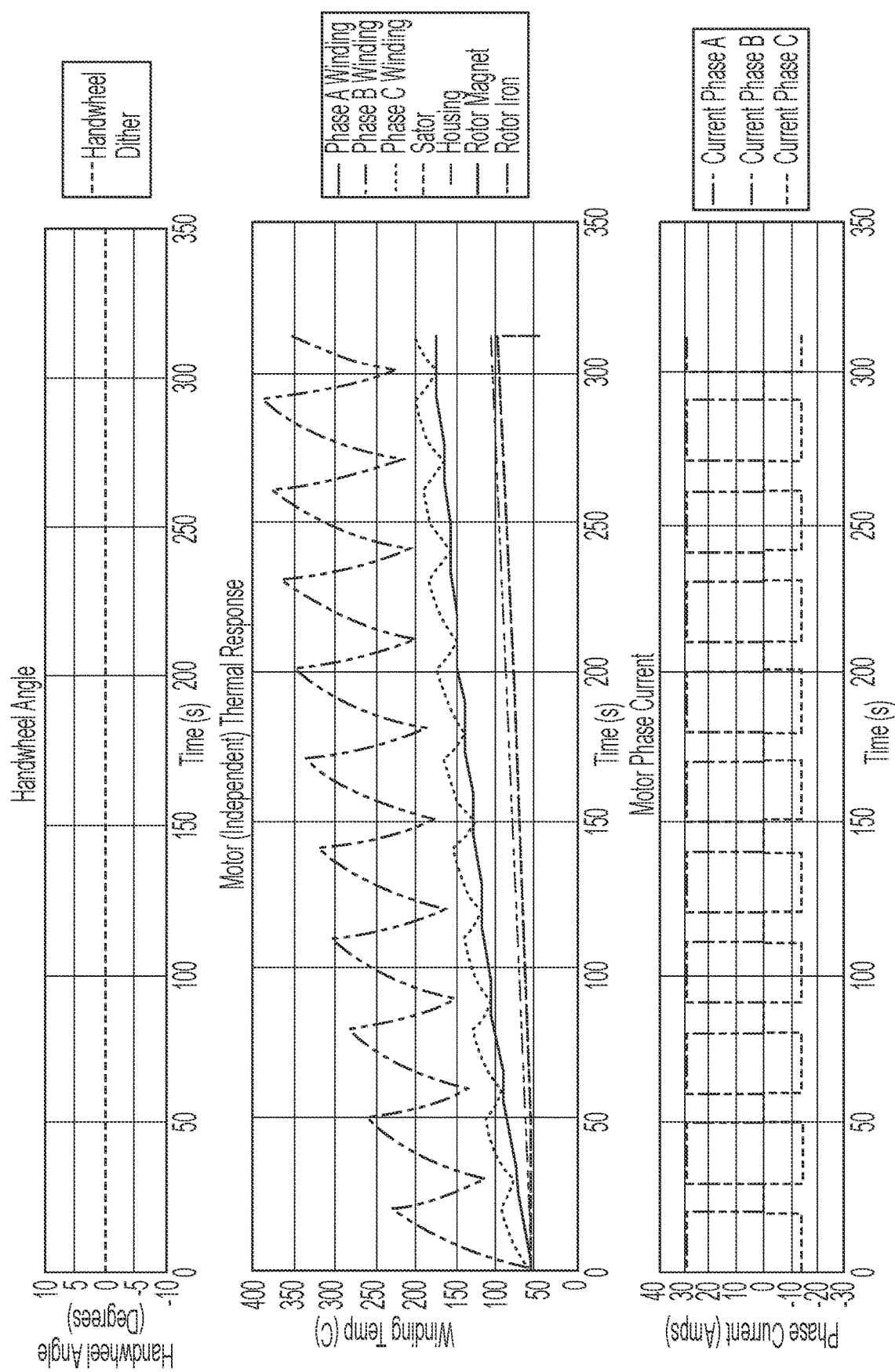
FIG. 4 is a diagram illustrating an impact of imbalances phased currents on temperature rise without mitigation, according to the principles of the present disclosure.

While holding at end-of-travel, the handwheel actuator motor may be at or near stall condition (e.g., 0 motor radians per second) while providing a high level of torque. This may result in high motor phase currents. Depending on the electrical position of the motor during end-of-travel hold, phase currents may not be balanced, which may result in higher power dissipation on one or more phases. FIG. 3 generally illustrates a range of power dissipation for each phase over one electrical revolution and FIG. 4 generally illustrates the imbalance in temperature rise that may occur when holding the rotor at the position illustrated in FIG. 3. This may result in 66.6% of power being dissipated through a single phase, while the other two phases only dissipate 33.3% of power, each. This imbalance results in increased temperature rise on the phase dissipating the most power.

Typically, to address the temperature rise, such systems rely on hardware designed to withstand the temperature rise caused by the unbalanced power dissipation. This may result in higher cost and larger packaging space. It may also require the use of challenging manufacturing processes, such as encapsulation or other heat transfer methods.

Accordingly, systems and methods, such as those described herein, configured to prevent high power dissipation in a single phase, and instead spread power dissipation across phases during end-of-travel holds, may be desirable. In some embodiments, the systems and methods described herein may be configured to allow for more optimal hardware design for packaging, lower cost, and avoidance of challenging manufacturing processes.

In some embodiments, the systems and methods described herein may be configured to provide a thermal management strategy to improve the distribution of power dissipation across motor and/or controller phases during end-of-travel hold events. The systems and methods described herein may be configured to prevent prolong operation in motor positions with unbalanced phase currents (e.g., which may result in a more balanced power dissipation and relatively lower temperature increase) by modifying system behavior based on sensor input and predefined parameters.

Figure 5:
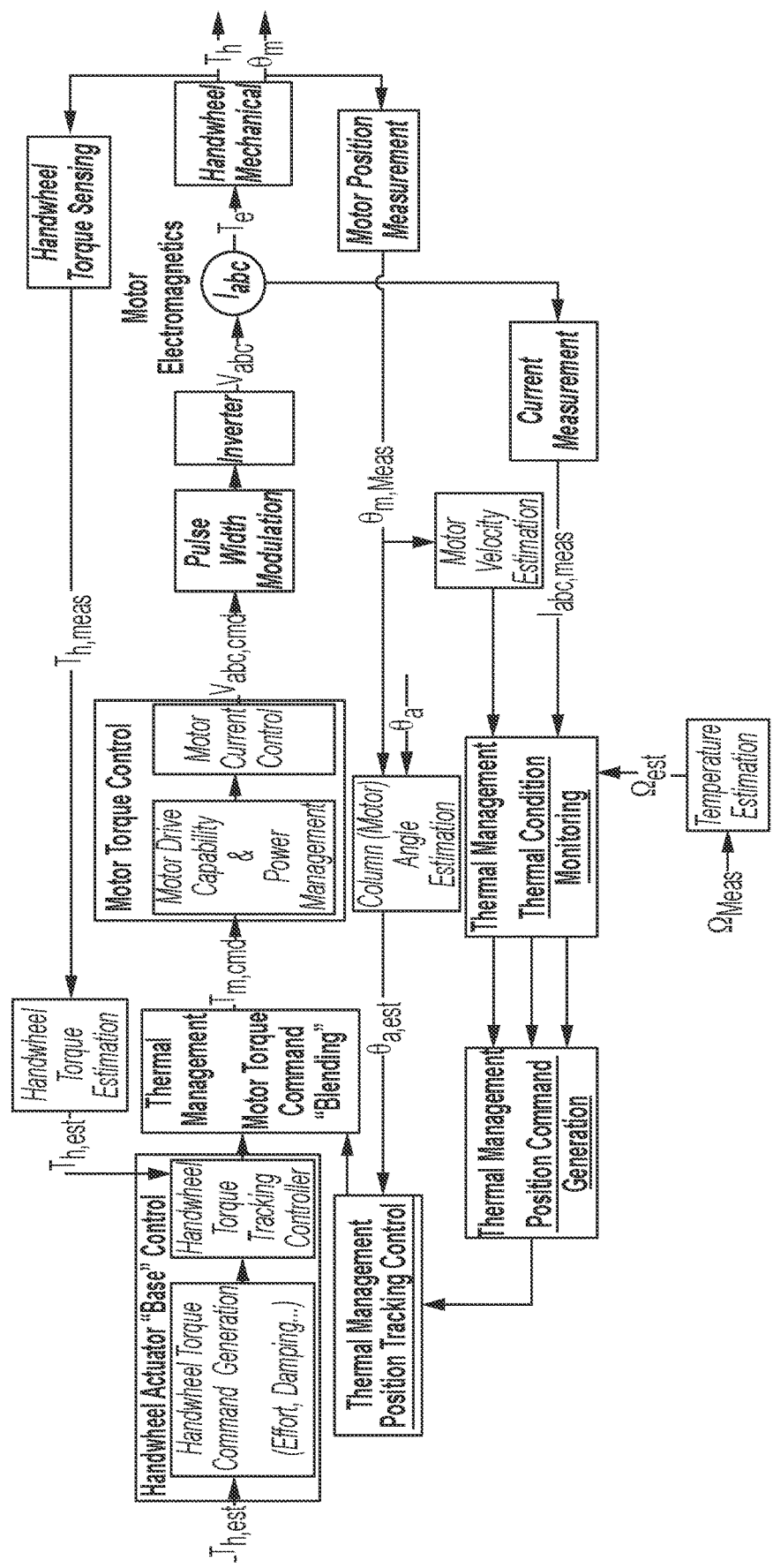
FIG. 5 generally illustrates an end of travel thermal management system according to the principles of the present disclosure.
Figure 6:
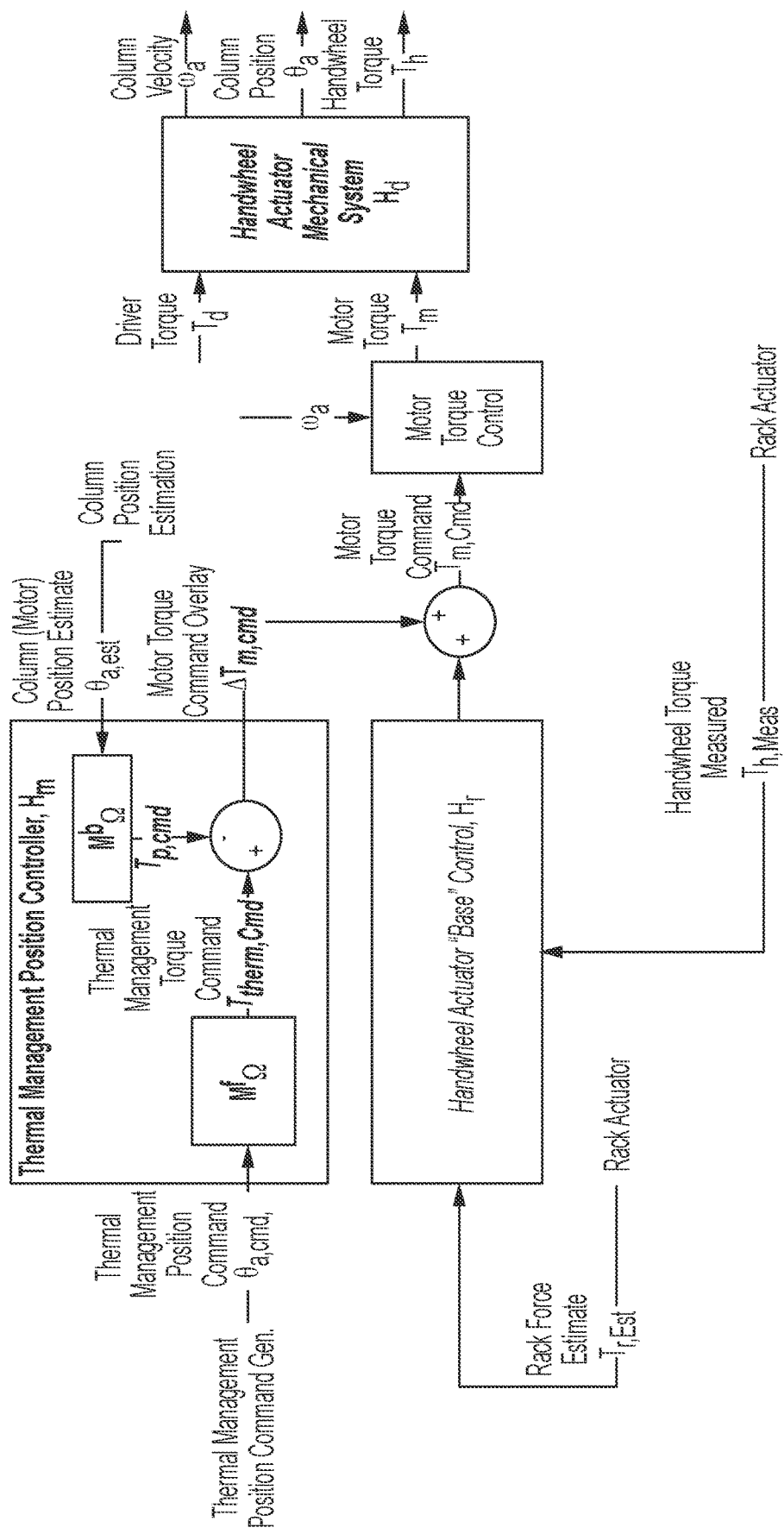
FIG. 6 generally illustrates a thermal management position tracking and torque command overly method according to the principles of the present disclosure.

In some embodiments, the systems and methods described herein may be configured to provide, as is generally illustrated in FIGS. 5 and 6, end-of-travel thermal management, which may include thermal condition monitoring, position command generation, position tracking control, motor torque command blending, and/or the like. The systems and methods described herein may be configured to determine a level of thermal mitigation by monitoring a condition of the steering system.

For example, as is generally illustrated in FIG. 5, the systems and methods described herein may be configured to generate one or more handwheel torque commands (e.g., using one or more torque estimation values ($T_{r,est}$)). The systems and methods described herein may be configured to generate, using a sensed handwheel torque ($T_{h,meas}$), one or more handwheel torque estimation values ($T_{h,est}$). The systems and methods described herein may be configured to use a handwheel torque tracking controller to generate, based on at least one torque command and one or more handwheel torque estimation values ($T_{h,est}$) a handwheel torque tracking output.

The systems and methods described herein may be configured to provide thermal management and provide motor torque command blending. The systems and methods described herein may be configured to generate a blended torque command ($T_{m,cmd}$). The systems and methods described herein may be configured to provide motor torque control. For example, the systems and methods described herein may be configured to generate, using the blended torque command, a voltage command ($V_{abc,cmd}$). The systems and methods described herein may be configured to providing pulse width modulation on the voltage command. The systems and methods described herein may be configured to use an inverter to generate, using the pulse width modulated voltage command, a motor voltage ($V_{abc}$). The systems and methods described herein may be configured to provide the motor voltage to motor.

The systems and methods described herein may be configured to generate, using motor torque ($T_e$), mechanical handwheel torque ($T_h$). The systems and methods described herein may be configured to, using motor position ($\theta_m$), measure motor position ($\theta_{m,meas}$). The systems and methods described herein may be configured to estimate a motor velocity using ($\theta_{m,meas}$). The systems and methods described herein may be configured to determine a column (motor) angle estimation ($\theta_{a,est}$) using a motor angle ($\theta_a$) and ($\theta_{m,meas}$).

The systems and methods described herein may be configured to provide thermal condition monitoring based on the motor velocity estimation, a motor current measurement ($I_{abc,meas}$), and a temperature estimation ($\Omega_{est}$) (e.g., estimated based on a temperature measurement ($\Omega_{meas}$)).

The systems and methods described herein may be configured to provide position command generation based on output of the thermal condition monitoring. The systems and methods described herein may be configured to provide position tracking control based on the output of the position command generation and the column (motor) angle estimation ($\theta_{a,est}$).

As is generally illustrated in FIG. 6, the systems and methods described herein may be configured to provide thermal management position control based a position command ($\theta_{a,cmd}$). The systems and methods described herein may be configured to sum a motor torque command overlay with a handwheel actuator base control output (e.g., generated based on a rack force estimate associated with a rack actuator and a handwheel torque measurement). The systems and methods described herein may be configured to provide motor torque control based on a motor torque command and a motor angle. The systems and methods described herein may be configured to, using a motor control torque measurement and a driver torque, control mechanical aspects of the handwheel actuator.

The thermal management position control may be defined according to FIG. 6 and:
Handwheel Actuator "Base" Dynamics:

$$\theta_a = H_d T_d + H_r T_{r,Est} + H_m \Delta T_{m,cmd}$$

where $\theta_a$ is a column position, $H_d$ is a handwheel actuator mechanical system transfer function, $H_r$ is a handwheel actuator base control transfer function, $H_m$ is a motor torque control transfer function, $T_d$ is a driver (e.g., or operator, of the vehicle) torque, $T_r$ is a rack force estimate (e.g. units of pinion torque), and $\Delta T_{m,cmd}$ is a thermal management motor torque command.

Thermal Management Position Control:

$$\Delta T_{m,Cmd} = M_\Omega^f \theta_{a,Cmd} - M_\omega^b \theta_{a,Est}$$

where $M_\Omega^f$ is a thermal management transfer function, $M_\Omega^b$ is a base torque command transfer function, $\theta_{a,Est}$ is a column position estimate, and $\theta_{a,Cmd}$ is a column position command.

Generalized Closed-Loop Position Tracking Dynamics:

$$\theta_a = H_d T_d + H_r T_{r,Est} + H_m \left( M_\Omega^f \theta_{a,Cmd} - M_\Omega^b \theta_{a,Est} \right)$$

$$\theta_a = H_d T_d + H_r T_{r,Est} + H_m M_\Omega^f \theta_{a,Cmd} - H_m M_\Omega^b \theta_{a,Est}$$

$$\theta_a = \frac{H_m M_\Omega^f}{1 + H_m M_\Omega^b} \theta_{a,Cmd} + \frac{H_d T_d + H_r T_{r,Est}}{1 + H_m M_\Omega^b}$$

$$\theta_a = \frac{H_m M_\Omega^f}{1 + H_m M_\Omega^b} \theta_{a,Cmd} + \frac{1}{1 + H_m M_\Omega^b} (H_d T_d + H_r T_{r,Est})$$

$$N_\theta = \text{Position Control Tracking Response} = \frac{H_m M_\Omega^f}{1 + H_m M_\Omega^b}$$

$$N_x = \text{Position Control Disturbance Rejection} = \frac{1}{1 + H_m M_\Omega^b}$$

Open Loop Position Control:
If $M_\Omega^b = 0$ (Open Loop)

$$\theta_a = H_m M_\Omega^f \theta_{a,Cmd} + H_d T_d + H_r T_{r,Est}$$

Ideal Position Tracking may be defined according to:

$$H_m M_\Omega^f \sim = 1$$

In some embodiments, the systems and methods described herein may be configured to perform a primary monitor function by using phase current magnitudes (e.g., which may be referred to herein as peak current estimates).

Thermal constraints of a SbW system force feedback actuator are dominated by end-of-travel events that occur at or near zero velocity. Because the system is at a stall condition during these events, it cannot be assumed that phase currents are balanced. To avoid the issue of requiring higher sample rates relative to a direct-quadrature-zero representation, the systems and methods described herein may be configured to use individual phase currents at or near zero velocities where phase currents are most likely to be imbalanced.

In some embodiments, the systems and methods described herein may be configured to, use direct-quadrature-zero representation for phase currents above a predefined velocity threshold (e.g., by assuming phase currents are balanced). The systems and methods described herein may be configured to employ a calibratable low pass filter on the incoming velocity signals to avoid rapid transitions. The systems and methods described herein may be configured to process an estimate peak current for each phase through a usage model (e.g., such as those described in U.S. Pat. No. 6,166,502, the contents of which are incorporated herein by reference in their entirety) to determine a usage based thermal metric.

In some embodiments, the systems and methods described herein may be configured to compute a separate thermal metric for each phase, which may allow for detection of imbalanced phase currents and/or may prevent premature limiting when phase currents are not imbalanced. The systems and methods described herein may be configured to output a maximum thermal metric for use by downstream functions.

Figure 7:
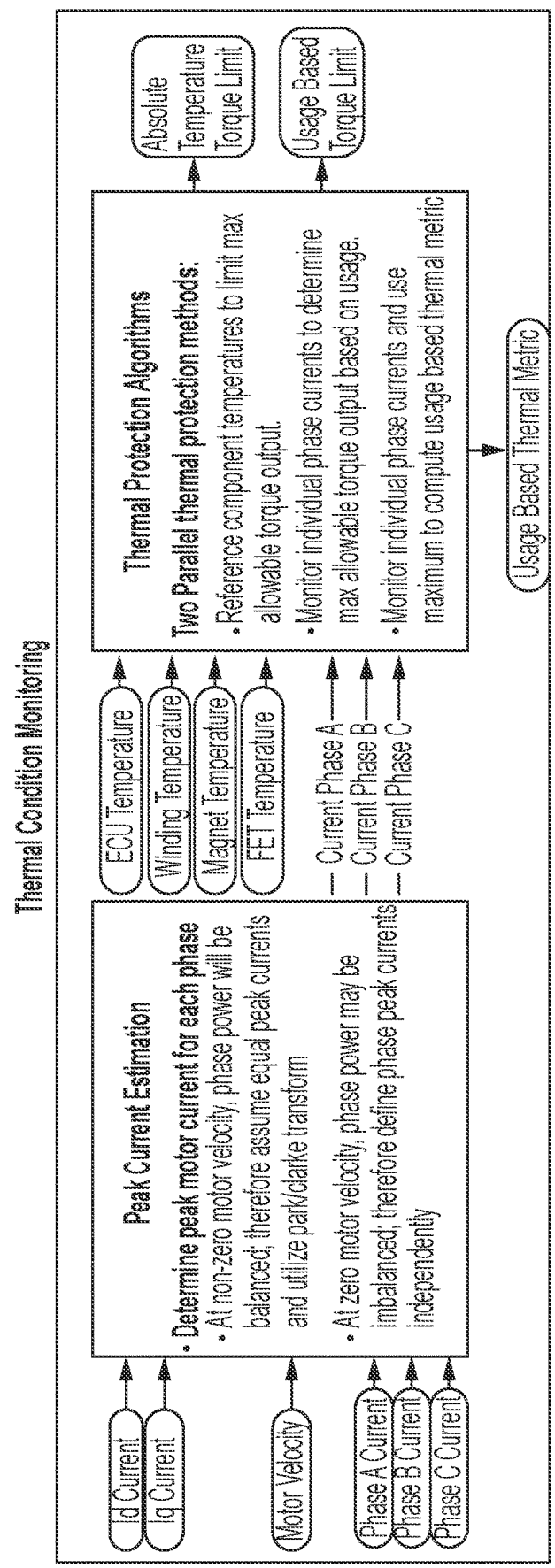
FIG. 7 generally illustrates a thermal condition monitoring method according to the principles of the present disclosure.
Figure 8:
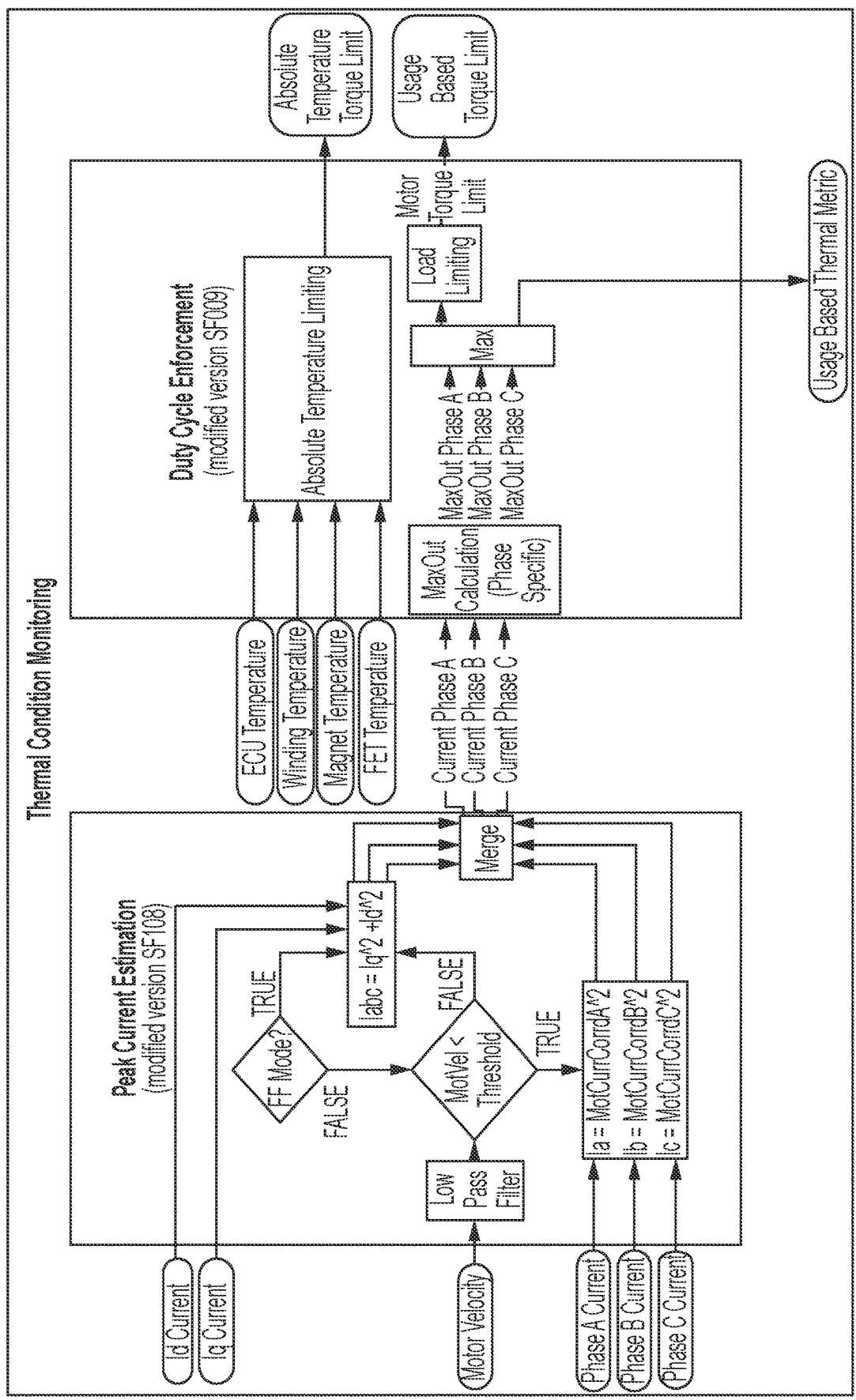
FIG. 8 generally illustrates an alternative thermal condition monitoring method according to the principles of the present disclosure.

In some embodiments, as is generally illustrated in FIGS. 7 and 8, the systems and methods described herein may be configured to provide thermal condition monitoring. The systems and methods described herein may be configured to use the thermal metric in conjunction with motor velocity to determine when to take thermal mitigation action. The systems and methods described herein may be configured to take no mitigation action for phase current velocities below a calibratable velocity threshold. The systems and methods described herein may be configured to take mitigation action for phase current velocities above the calibratable threshold (e.g., which may indicate phase current velocities at or near zero, which may correspond to an imbalanced phase current condition).

In some embodiments, the systems and methods described herein may be configured to use a low pass filter with calibratable cutoff frequency on the incoming velocity signal to avoid abrupt changes in thermal mitigation. When velocity is below the calibrated threshold, the systems and methods described herein may use lookup tables to determine the parameters of thermal mitigation based on the state of the thermal metric.

The systems and methods described herein may be configured to induce relatively small changes in the motor position during end-of-travel holds to avoid long periods of imbalanced phase currents. The change in position to the rotor may include sufficient magnitude and frequency to improve the balance of power dissipation between phases, while not being too large as to cause significant driver dissatisfaction. In order to minimize the impact to the driver, the systems and methods described herein may be configured to vary the magnitude, frequency, and type of rotor position movement depending on the state of the thermal metric. For example, if the thermal metric has a moderate value, indicating moderate heating, the systems and methods described herein may be configured to use a low magnitude and frequency movement to avoid further heating without significant disruption to the driver. Alternatively, if the thermal metric has a high value, indicating significant heating, the systems and methods described herein may be configured to increase the magnitude and frequency of movement to lower the peak motor temperature.

The systems and methods descried herein may be configured to identified one or more thermal mitigation parameters, such as a thermal mitigation type, a thermal magnitude of motion, a thermal mitigation frequency, other suitable parameters or a combination thereof, using one or more calibratable look-up tables, using the thermal metric (e.g., which may be the independent variable for each look-up table).

In some embodiments, a thermal mitigation type may define the motion profile to be induced. The motion profile may include at least one of a sinusoidal waveform profile, a trapezoidal waveform profile, a square waveform profile, a step function profile e.g., (move to optimal thermal position); a non-geometric profile (predefined profile) or a combination thereof.

In some embodiments, the systems and methods may be configured to induce a thermal magnitude of motion in the motor. A thermal magnitude of motion be defined in a handwheel angle or a motor angle. The range of the magnitude may include any suitable range, such as 0-30 electrical motor degrees or other suitable range, and may represent an amount of motion to provide full balance power dissipation. Additionally, or alternatively, the systems and methods described herein may be configured to use intermediate values if less severe heating is indicated by the thermal metric.

In some embodiments, a thermal mitigation frequency may correspond to a frequency at which a specified waveform is repeated (e.g., having a range of 0.1 hertz to 0.5 hertz or other suitable range).

In some embodiments, the systems and methods described herein may be configured to, after identifying the one or more thermal mitigation parameters using the look-up tables, use the one or more thermal mitigation parameters to generate at least one thermal management motor position command.

Figure 9:
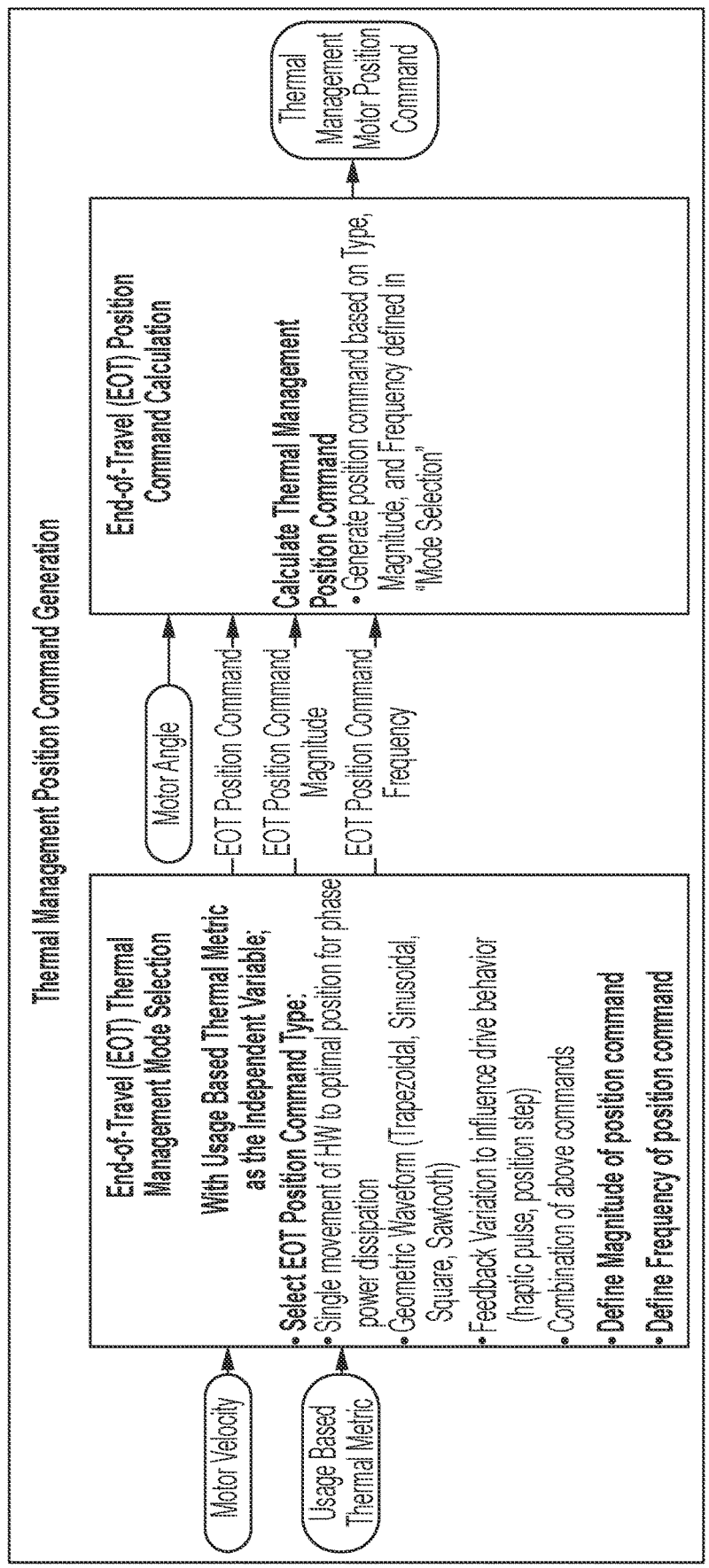
FIG. 9 generally illustrates a thermal management motor position command generation method according to the principles of the present disclosure.
Figure 10:
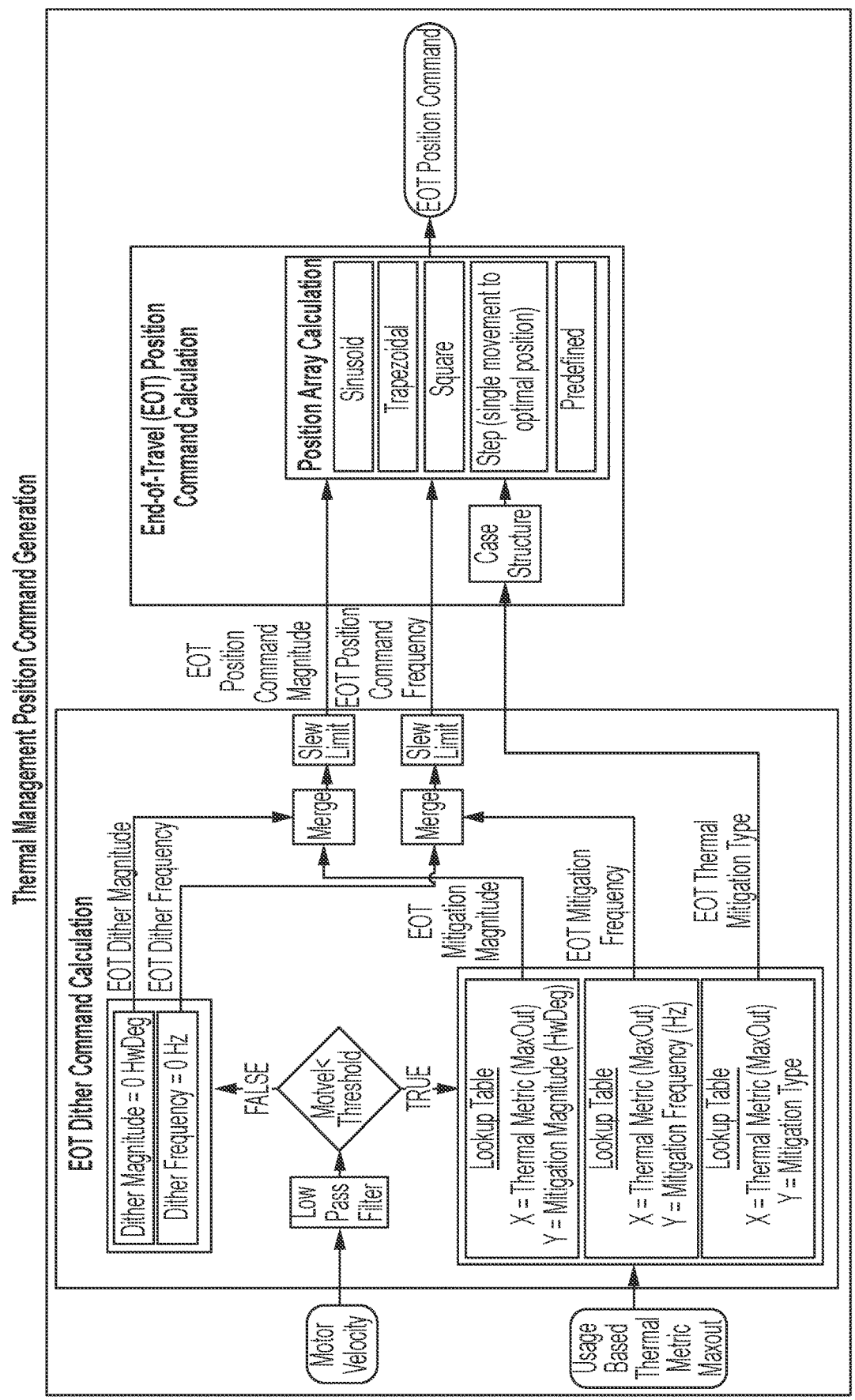
FIG. 10 generally illustrates an alternative thermal management motor position command generation method according to the principles of the present disclosure.

As is generally illustrated in FIGS. 9 and 10, the systems and methods described herein may be configured to perform thermal management position tracking control. The systems and methods described herein may be configured to use open loop control to generate at least one motor toque command based on the thermal management motor position command. The systems and methods described herein may be configured to sum the at least one motor torque command with a motor torque command from a corresponding base controller, as is generally illustrated in FIG. 6.

In some embodiments, the systems and methods described herein may be configured to provide a position signal overlay by modifying the thermal management motor position command by combining the thermal management motor position command with a measured handwheel position. The systems and methods described herein may be configured to provide a signal corresponding to the modified thermal management motor position command to a proportional controller for motor torque command generation.

In some embodiments, the systems and methods described herein may be configured to provide a phase voltage modification by directly modifying phase voltages based on the thermal management motor position command.

Figure 11:
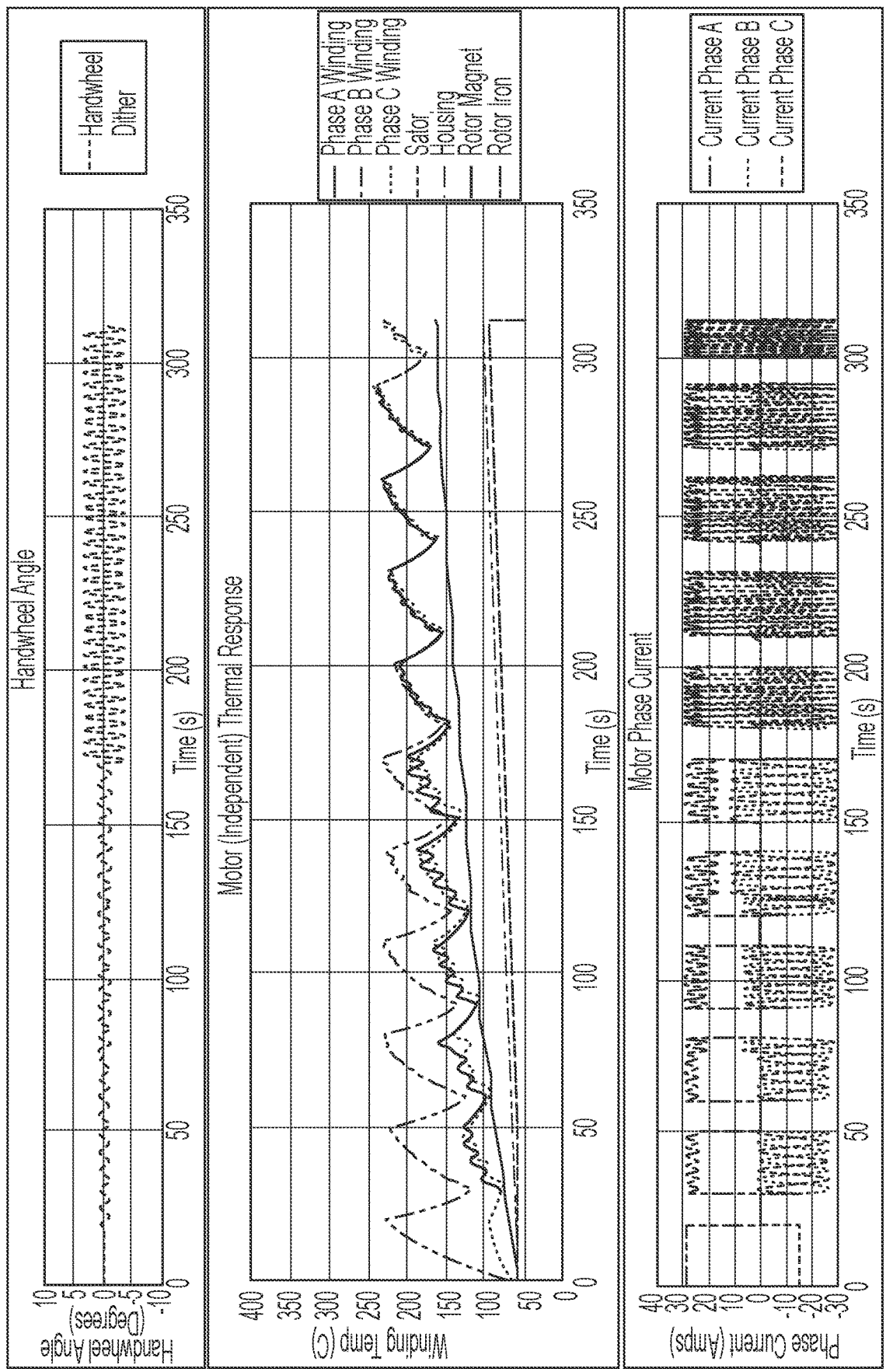
FIG. 11 is a diagram illustrating an impact of imbalances phased currents on temperature rise with mitigation, according to the principles of the present disclosure.

In some embodiments, the systems and methods described herein may be configured to provide thermal mitigation techniques that may result in significant improvement in peak motor temperatures, as is generally illustrated in FIG. 11. In some embodiments, the systems and methods described herein may be configured to provide feedback to the driver, such as haptic feedback or other suitable feedback, during performance of the thermal mitigation techniques described herein.

In some embodiments, the systems and methods described herein may be configured to allow for torque output to be maintained while still mitigating temperature through manipulation of rotor position. Additionally, or alternatively, the systems and methods described herein may be configured to compute a thermal metric for individual phases to detect phase imbalance.

In some embodiments, the systems and methods described herein may be configured to receive motor velocity data. The systems and methods described herein may be configured to, in response to a determination that the motor velocity data indicates that a velocity of a motor is below a threshold velocity, calculate a thermal metric corresponding to a phase imbalance of the motor. In some embodiments, the threshold velocity may include a calibratable threshold.

The systems and methods described herein may be configured to identify at least one thermal mitigation parameter based on the thermal metric. In some embodiments, identifying the at least one thermal mitigation parameter based on the thermal metric may include using at least one look-up table associated with the thermal metric.

The systems and methods described herein may be configured to generate at least one thermal management motor position command based on the at least one thermal mitigation parameter. The systems and methods described herein may be configured to selectively control the motor according to the thermal management motor position command. In some embodiments, selectively controlling the motor according to the thermal management motor position command may include modifying at least one phase voltage of the motor based on the thermal management motor position command.

In some embodiments, the systems and methods described herein may be configured to use an open loop control to generate a motor torque command based on the thermal management motor position command. The systems and methods described herein may be configured to selectively control the motor further according to the motor torque command.

In some embodiments, the systems and methods described herein may be configured to modify the thermal management motor position command by combining the thermal management motor position command with a measured handwheel position. The systems and methods described herein may be configured to use the modified thermal management motor position command to generate a motor torque command. The systems and methods described herein may be configured to selectively control the motor further according to the motor torque command.

Figure 1:
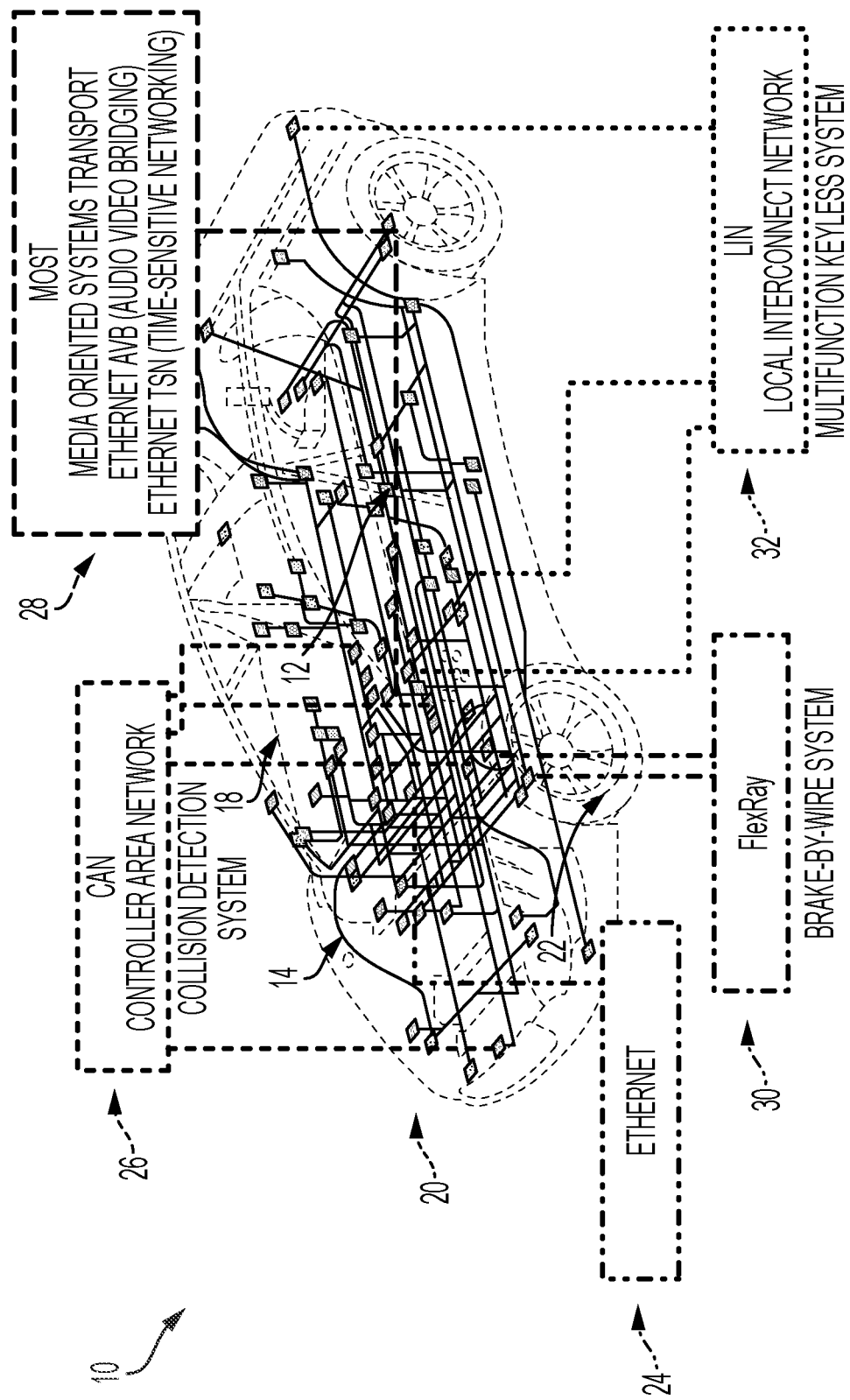
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), or other suitable steering system. The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof. Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
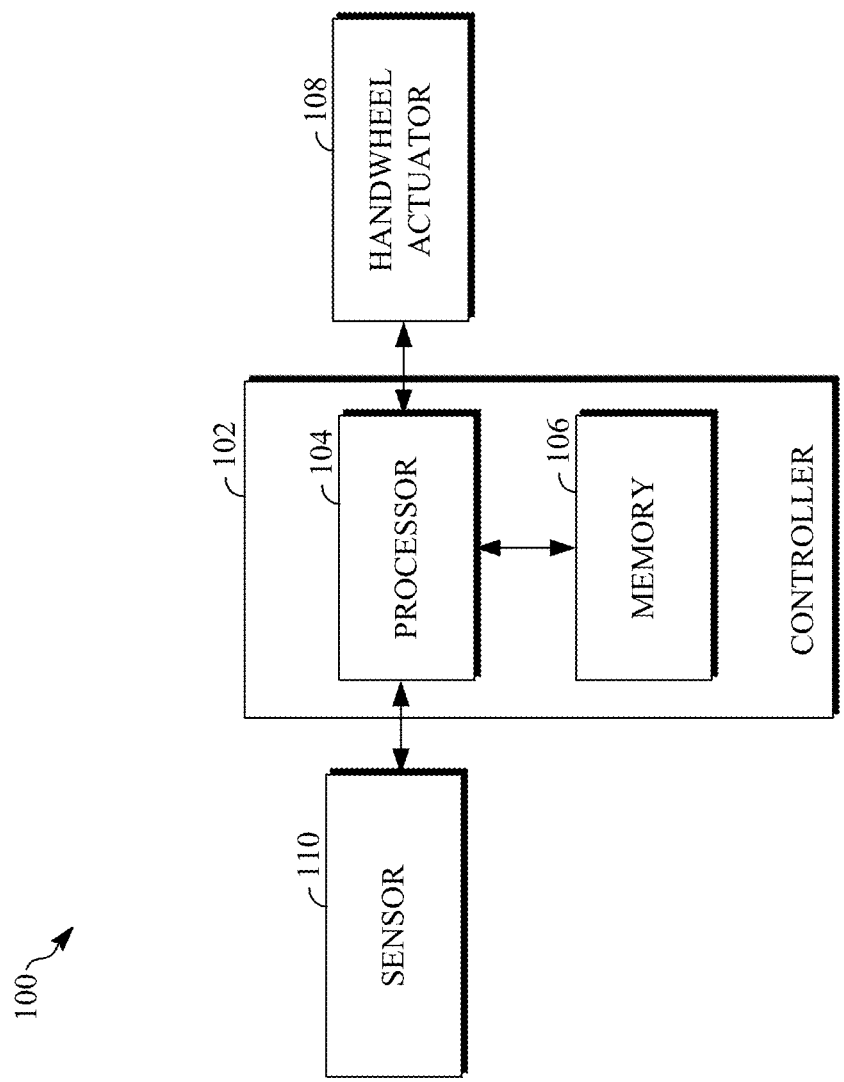
FIG. 2 generally illustrates a vehicle controller system including a controller according to the principles of the present disclosure.

In some embodiments, the vehicle 10 may include a system 100 that includes a controller, such as controller 102, as is generally illustrated in FIG. 2. The controller 102 may include any suitable controller, such as an electronic control unit or other suitable controller. The controller 102 may be configured to control, for example, the various functions of the steering system and/or various functions of the vehicle 10. The controller 102 may include a processor 104 and a memory 106. The processor 104 may include any suitable processor, such as those described herein. Additionally, or alternatively, the controller 102 may include any suitable number of processors, in addition to or other than the processor 104. The memory 106 may comprise a single disk or a plurality of disks (e.g., hard drives), and includes a storage management module that manages one or more partitions within the memory 106. In some embodiments, memory 106 may include flash memory, semiconductor (solid state) memory or the like. The memory 106 may include Random Access Memory (RAM), a Read-Only Memory (ROM), or a combination thereof. The memory 106 may include instructions that, when executed by the processor 104, cause the processor 104 to, at least, control various aspects of the vehicle 10.

The controller 102 may receive one or more signals from various measurement devices or sensors 110 indicating sensed or measured characteristics of the vehicle 10. The sensors 110 may include any suitable sensors, measurement devices, and/or other suitable mechanisms. For example, the sensors 110 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiment, the system 100 includes a handwheel actuator 108. The handwheel actuator 108 may include any suitable actuator and may comprise one or more actuators. The handwheel actuator 108 may be configured to apply torque to the handwheel of the vehicle 10. The handwheel actuator 108 may include or be in communication with one or more sensors, such as the sensors 110, configured to sense an amount of torque applied by to the handwheel of the vehicle 10 by the operator and/or to sense an amount of torque applied handwheel actuator 108.

In some embodiments, the controller 102 may be configured to provide thermal mitigation techniques for a motor, as described. The motor may include any suitable motor of the vehicle 10 and/or any other suitable motor not associated with the vehicle 10. The controller 102 may receive motor velocity data, from any suitable source including the sensors 110, or other suitable source. The controller 102 may determine whether a motor velocity corresponding to the motor velocity data is greater than a threshold velocity. If the controller 102 determines that the motor velocity is greater than the threshold velocity, the controller 102 continues to monitor the motor velocity via the motor velocity data.

Alternatively if the controller 102 determines the motor velocity is below the threshold velocity, the controller 102 may calculate a thermal metric corresponding to a phase imbalance of the motor. In some embodiments, the threshold velocity may include a calibratable threshold.

The controller 102 may identify at least one thermal mitigation parameter based on the thermal metric. The controller 102 may identify the at least one thermal mitigation parameter using any suitable technique, such as using at least one look-up table associated with the thermal metric or other suitable technique.

The controller 102 may generate at least one thermal management motor position command based on the at least one thermal mitigation parameter. The controller 102 may selectively control the motor according to the thermal management motor position command. In some embodiments, the controller 102 may control the motor by modifying at least one phase voltage of the motor based on the thermal management motor position command.

In some embodiments, the controller 102 may use an open loop control to generate a motor torque command based on the thermal management motor position command. The controller 102 may selectively control the motor further according to the motor torque command.

In some embodiments, the controller 102 may modify the thermal management motor position command by combining the thermal management motor position command with a measured handwheel position. The controller 102 may use the modified thermal management motor position command to generate a motor torque command. The controller 102 may selectively control the motor further according to the motor torque command.

In some embodiments, the controller 102 may perform the methods described herein. However, the methods described herein as performed by the controller 102 are not meant to be limiting, and any type of software executed on a controller or processor can perform the methods described herein without departing from the scope of this disclosure. For example, a controller, such as a processor executing software within a computing device, can perform the methods described herein.

Figure 12:
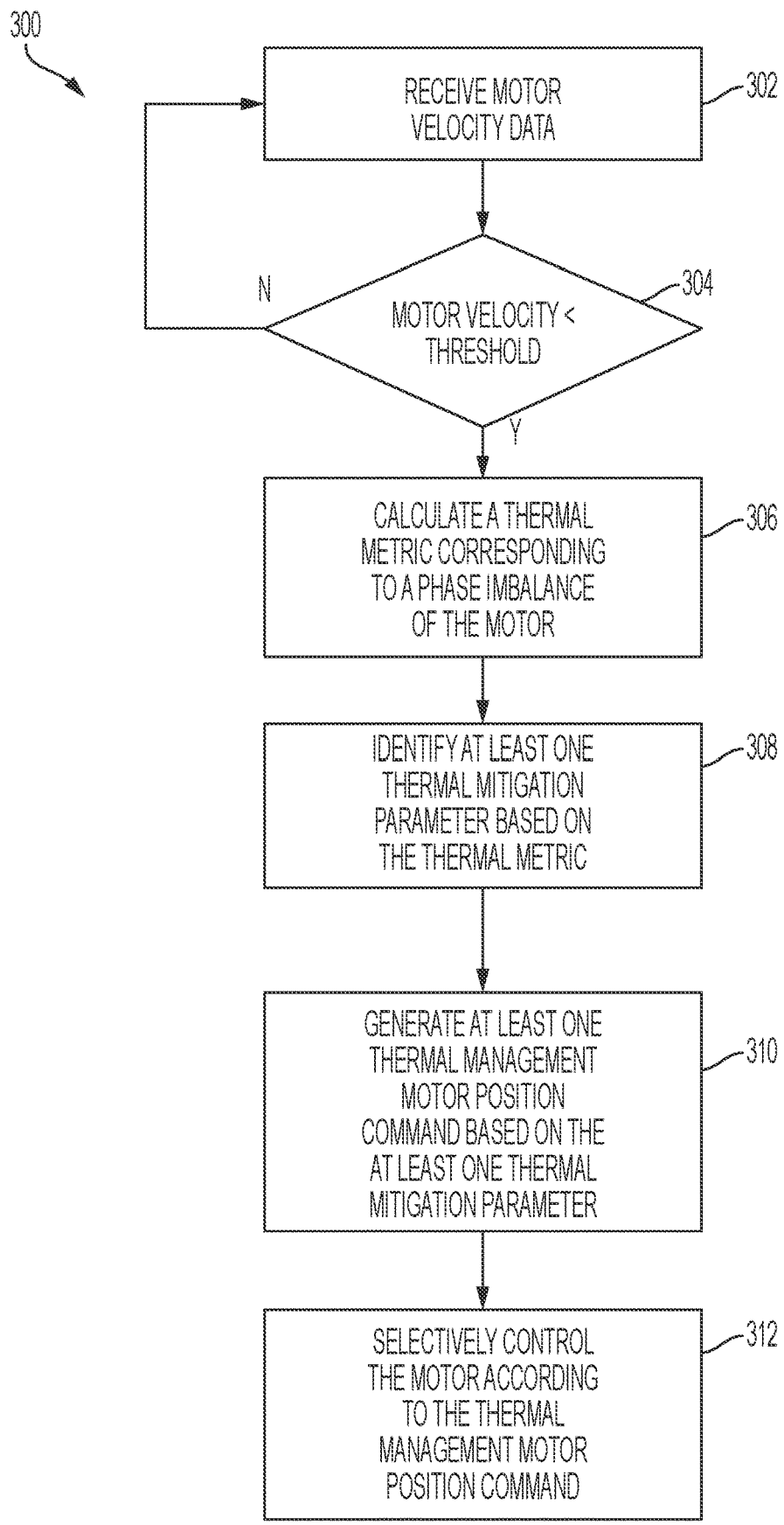
FIG. 12 is a flow diagram generally illustrating a thermal mitigation method according to the principles of the present disclosure.

FIG. 12 is a flow diagram generally illustrating a thermal mitigation method 300 according to the principles of the present disclosure. At 302, the method 300 receives motor velocity data. For example, the controller 102 may receive the motor velocity data.

At 304, the method 300 determines whether a motor velocity is less than a threshold. For example, the controller 102 may determine whether the motor velocity is less than the threshold. If the controller 102 determines that the motor velocity is not less than the threshold, the method 300 continues at 302. Alternatively, if the controller 102 determines that the motor velocity is less than the threshold, the method 300 continues at 306.

At 306, the method 300 calculates a thermal metric corresponding to a phase imbalance of the motor. For example, the controller 102 may calculate a thermal metric corresponding to a phase imbalance of the motor.

At 308, the method 300 identifies at least one thermal mitigation parameter based on the thermal metric. For example, the controller 102 may identify the at least one thermal mitigation parameter based on the thermal metric.

At 310, the method 300 generates at least one thermal management motor position command based on the at least one thermal mitigation parameter. For example, the controller 102 may generate the at least one thermal management motor position command based on the at least one thermal mitigation parameter.

At 312, the method 300 selectively controls the motor according to the thermal management motor position command. For example, the controller 102 may selectively control the motor according the thermal management motor position command.

In some embodiments, a method for preventing motor operation in motor positions having unbalanced phase currents includes receiving motor velocity data, and, in response to a determination that the motor velocity data indicates that a velocity of a motor is below a threshold velocity: calculating a thermal metric corresponding to a phase imbalance of the motor; identifying at least one thermal mitigation parameter based on the thermal metric; generating at least one thermal management motor position command based on the at least one thermal mitigation parameter; and selectively controlling the motor according to the thermal management motor position command.

In some embodiments, the method also includes using an open loop control to generate a motor torque command based on the thermal management motor position command, and selectively controlling the motor further according to the motor torque command. In some embodiments, the method also includes: modifying the thermal management motor position command by combining the thermal management motor position command with a measured handwheel position; using the modified thermal management motor position command to generate a motor torque command; and selectively controlling the motor further according to the motor torque command. In some embodiments, selectively controlling the motor according to the thermal management motor position command includes modifying at least one phase voltage of the motor based on the thermal management motor position command. In some embodiments, the threshold velocity includes a calibratable threshold. In some embodiments, identifying the at least one thermal mitigation parameter based on the thermal metric includes using at least one look-up table associated with the thermal metric. In some embodiments, the motor is associated with a steering system of a vehicle. In some embodiments, the steering system includes a steer-by-wire steering system.

In some embodiments, a system for preventing motor operation in motor positions having unbalanced phase currents includes a processor and a memory. The memory includes instructions that, when executed by the processor, cause the processor to: receive motor velocity data, and, in response to a determination that the motor velocity data indicates that a velocity of a motor is below a threshold velocity: calculate a thermal metric corresponding to a phase imbalance of the motor; identify at least one thermal mitigation parameter based on the thermal metric; generate at least one thermal management motor position command based on the at least one thermal mitigation parameter; and selectively control the motor according to the thermal management motor position command.

In some embodiments, the instructions further cause the processor to use an open loop control to generate a motor torque command based on the thermal management motor position command, and selectively control the motor further according to the motor torque command. In some embodiments, the instructions further cause the processor to: modify the thermal management motor position command by combining the thermal management motor position command with a measured handwheel position; use the modified thermal management motor position command to generate a motor torque command; and selectively control the motor further according to the motor torque command. In some embodiments, selectively controlling the motor according to the thermal management motor position command includes modifying at least one phase voltage of the motor based on the thermal management motor position command. In some embodiments, the threshold velocity includes a calibratable threshold. In some embodiments, identifying the at least one thermal mitigation parameter based on the thermal metric includes using at least one look-up table associated with the thermal metric. In some embodiments, the motor is associated with a steering system of a vehicle. In some embodiments, the steering system includes a steer-by-wire steering system.

In some embodiments, an apparatus for preventing motor operation in motor positions having unbalanced phase currents includes a processor and a memory. The memory includes instructions that, when executed by the processor, cause the processor to: receive motor velocity data; and, in response to a determination that the motor velocity data indicates that a velocity of a motor is below a threshold velocity: calculate a thermal metric corresponding to a phase imbalance of the motor; identify, using at least one look-up table associated with the thermal metric, at least one thermal mitigation parameter based on the thermal metric; generate at least one thermal management motor position command based on the at least one thermal mitigation parameter; modify the thermal management motor position command by combining the thermal management motor position command with a measured handwheel position; and selectively control the motor according to the modified thermal management motor position command.

In some embodiments, the motor is associated with a steering system of a vehicle. In some embodiments, the steering system includes a steer-by-wire steering system.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for preventing motor operation in motor positions having unbalanced phase currents, the method comprising:
   receiving motor velocity data; and
   in response to a determination that the motor velocity data indicates that a velocity of a motor is below a threshold velocity:
      calculating a thermal metric corresponding to a phase imbalance of the motor;
      identifying at least one thermal mitigation parameter based on the thermal metric;
      generating at least one thermal management motor position command based on the at least one thermal mitigation parameter; and
      selectively controlling the motor according to the thermal management motor position command.

2. The method of claim 1, further comprising using an open loop control to generate a motor torque command based on the thermal management motor position command, and selectively controlling the motor further according to the motor torque command.

3. The method of claim 1, further comprising modifying the thermal management motor position command by combining the thermal management motor position command with a measured handwheel position.

4. The method of claim 3, further comprising:
   using the modified thermal management motor position command to generate a motor torque command; and
   selectively controlling the motor further according to the motor torque command.

5. The method of claim 1, wherein selectively controlling the motor according to the thermal management motor position command includes modifying at least one phase voltage of the motor based on the thermal management motor position command.

6. The method of claim 1, wherein the threshold velocity includes a calibratable threshold.

7. The method of claim 1, wherein identifying the at least one thermal mitigation parameter based on the thermal metric includes using at least one look-up table associated with the thermal metric.

8. The method of claim 1, wherein the motor is associated with a steering system of a vehicle.

9. The method of claim 8, wherein the steering system includes a steer-by-wire steering system.

10. A system for preventing motor operation in motor positions having unbalanced phase currents, the system comprising:
    a processor; and
    a memory including instructions that, when executed by the processor, cause the processor to:
       receive motor velocity data; and
       in response to a determination that the motor velocity data indicates that a velocity of a motor is below a threshold velocity:
          calculate a thermal metric corresponding to a phase imbalance of the motor;
          identify at least one thermal mitigation parameter based on the thermal metric;
          generate at least one thermal management motor position command based on the at least one thermal mitigation parameter; and
          selectively control the motor according to the thermal management motor position command.

11. The system of claim 10, wherein the instructions further cause the processor to use an open loop control to generate a motor torque command based on the thermal management motor position command, and selectively control the motor further according to the motor torque command.

12. The system of claim 10, wherein the instructions further cause the processor to:
    modify the thermal management motor position command by combining the thermal management motor position command with a measured handwheel position;
    use the modified thermal management motor position command to generate a motor torque command; and
    selectively control the motor further according to the motor torque command.

13. The system of claim 10, wherein selectively controlling the motor according to the thermal management motor position command includes modifying at least one phase voltage of the motor based on the thermal management motor position command.

14. The system of claim 10, wherein the threshold velocity includes a calibratable threshold.

15. The system of claim 10, wherein identifying the at least one thermal mitigation parameter based on the thermal metric includes using at least one look-up table associated with the thermal metric.

16. The system of claim 10, wherein the motor is associated with a steering system of a vehicle.

17. The system of claim 16, wherein the steering system includes a steer-by-wire steering system.

18. An apparatus for preventing motor operation in motor positions having unbalanced phase currents, the apparatus comprising:
    a processor; and
    a memory including instructions that, when executed by the processor, cause the processor to:
       receive motor velocity data; and
       in response to a determination that the motor velocity data indicates that a velocity of a motor is below a threshold velocity:
          calculate a thermal metric corresponding to a phase imbalance of the motor;
          identify, using at least one look-up table associated with the thermal metric, at least one thermal mitigation parameter based on the thermal metric;
          generate at least one thermal management motor position command based on the at least one thermal mitigation parameter;
          modify the thermal management motor position command by combining the thermal management motor position command with a measured handwheel position; and
          selectively control the motor according to the modified thermal management motor position command.

19. The apparatus of claim 18, wherein the motor is associated with a steering system of a vehicle.

20. The apparatus of claim 19, wherein the steering system includes a steer-by-wire steering system.

* * * * *